United States Patent [19]

Waldman

[11] 4,251,692
[45] Feb. 17, 1981

[54] TELEPHONE CALL RESTRICTING APPARATUS

[76] Inventor: Herbert H. Waldman, 1739 52nd St., Brooklyn, N.Y. 11204

[21] Appl. No.: 949,014

[22] Filed: Oct. 6, 1978

[51] Int. Cl.³ .............................................. H04M 3/38
[52] U.S. Cl. .............................................. 179/18 DA
[58] Field of Search ................................. 179/18 DA

[56] References Cited

U.S. PATENT DOCUMENTS

| | | | |
|---|---|---|---|
| 3,727,007 | 4/1973 | Catlin | 179/18 DA |
| 3,851,109 | 11/1974 | Downs et al. | 179/18 DA |
| 3,899,640 | 8/1975 | Piacente et al. | 179/18 DA |
| 4,000,380 | 12/1976 | Jackson | 179/90 D |
| 4,002,848 | 1/1977 | Stein | 179/18 DA |
| 4,063,036 | 12/1977 | Hunsicker | 179/6.3 R |
| 4,096,357 | 6/1978 | Mogtader | 179/18 DA |
| 4,124,781 | 11/1978 | Mellon | 179/90 D |

FOREIGN PATENT DOCUMENTS

| | | | |
|---|---|---|---|
| 1250499 | 9/1967 | Fed. Rep. of Germany | 179/18 DA |
| 1907237 | 9/1970 | Fed. Rep. of Germany | 179/18 DA |
| 2279281 | 2/1976 | France | 179/18 DA |
| 1187073 | 4/1970 | United Kingdom | 179/18 DA |

*Primary Examiner*—Thomas W. Brown
*Attorney, Agent, or Firm*—Friedman, Goodman & Teitelbaum

[57] ABSTRACT

An apparatus for restricting telephone calls placed onto a telephone line by a telephone set, wherein an off-hook condition begins operation of the apparatus and energizes a control circuit which provides a condition in which a call can be placed onto the telephone line. A disabling circuit responds to the control circuit and establishes a disabling condition on the telephone line which defeats a telephone call when it is of a restricted type. In one embodiment, the off-hook condition starts a time delay at the end of which a predetermined frequency is placed onto the line. The occurrence of this frequency signal onto the telephone line disconnects all long distance telephone calls beyond a specified local zone. In a second embodiment, each number entered onto the telephone line is counted, and when a predetermined count is reached the disabling circuit is operated to prevent further calling. In a third embodiment, the telephone remains disabled after being placed in an off-hook condition, and all calling is prevented. However, at predetermined intervals, the telephone is enabled so that during each interval a respective number can be called. The apparatus can include an override circuit for use by special preselected individuals for overriding the disabling condition, thereby permitting such special individuals to avoid the restrictions of the telephone calls.

42 Claims, 5 Drawing Figures

TELEPHONE CALL RESTRICTING APPARATUS

BACKGROUND OF THE INVENTION

This invention relates to telephone apparatus, and more particularly to an apparatus which can be utilized to restrict the type of calls placed by a particular telephone set onto a telephone line.

In many situations it is desirous to restrict the type of calls which can be placed through a particular telephone set onto a telephone line. For example, in large companies, almost all personnel have access to a telephone for both incoming and outgoing calls. Such telephones are generally unrestricted and as a result personnel can place all type of calls, including long distance telephone calls with the telephone. In many cases the long distance calls are of a personal nature and there is no way to identify the particular individual placing the call in order to change him for the use of the telephone. As a result, the availability of the telephones are abused and companies must frequently pay huge telephone bills, which actually are personal calls and not company calls.

In other situations, the telephone may be a part of a switching network which is used both for internal as well as external use. While it is desired that all types of incoming calls should be received on the telephone sets, it is frequently desired to restrict outgoing calls to only intercompany use. As a result, only four or five digits are to be dialed. The telephones are not to be utilized for any calls either locally outside of the immediate company and surely not for long distance calls.

In some situations, selective restriction is desired. For example, sometimes it may be desired to completely restrict usage of particular telephone sets thereby preventing any outgoing calls at all. At other times, it is desirous to modify the restriction and only prevent certain long distance calls. Such selective application of a restriction would be beneficial to particularly accommodate the needs of the personnel as well as the needs of a company employing many telephones and telephone lines.

While restrictions on particular telephone lines are desired, at the same time certain personnel may need access to these same telephone lines without restriction. Thus, although a particular telephone line has an apparatus restricting its use to selective types of calls, that same apparatus when used by executive personnel must not have any restrictions. The executive personnel must be able to override or disengage the restriction and have access to the use of the phone line for all types of calls.

An additional problem is the ability to accommodate varied types of telephone systems. In some cases, rotary dial systems are still utilized while others employ Touch-Tone systems. To further complicate matters in some companies there may be a mixture of rotary dial and Touch-Tone systems and the type of restricting apparatus must provide accommodation to both types of telephones.

SUMMARY OF THE INVENTION

It is accordingly an object of the present invention to provide an apparatus for restricting the type of calls placed by a telephone set onto the telephone line.

A further object of the present invention is to provide a telephone restricting apparatus which can restrict the use of a telephone to local calls and prevent long distance calls.

Another object of the present invention is to provide a restricting apparatus for a telephone set which can be utilized for both rotary dialing and Touch-Tone telephone systems.

Yet a further object of the present invention is to provide a telephone restricting apparatus which restricts the type of calls placed on a telephone set, and is connected in parallel across the telephone line.

Another object of the present invention is to provide a telephone call restricting apparatus which can be selectively utilized to restrict certain type of calls, such as long distance calls, central switching calls, or all outgoing calls.

Another object of the present invention is to provide a telephone call restricting apparatus which is capable of distinguishing and can restrict operator assisted outgoing calls of a restricted nature beyond a specified zone while permitting operator assisted calls of other natures such as emergencies or local calls.

Still another object of the present invention is to provide a telephone call restricting apparatus which generally restricts specified types of calls, but which can be disengaged by specially selected personnel.

A further object of the present invention is to provide a telephone restricting apparatus which detects the type of call placed on the telephone line, and when it is of a restricted type, establishes a disabling condition on the telephone line which inhibits further progress of the telephone call.

Yet a further object of the present invention is to provide an apparatus for restricting certain types of telephone calls which will operate to inhibit the progress of a restricted outgoing call without preventing the operation of receiving incoming calls.

A further object of the present invention is to provide an apparatus for attachment to a telephone line which can prevent progress of a restricted type of call without interferring with calls of a non-restricted type.

Still a further object of the present invention is to provide an apparatus for restricting the type of calls, wherein only a preselected number of digits can be entered and wherein said number can be selectively adjusted.

A further object of the present invention is to provide an apparatus for restricting the dialing of long distance calls on a telephone set, and which also can warn the user of the restricted nature of the telephone set while providing the information to an operator who might be placing the call.

Still another object of the present invention is to provide an apparatus for restricting the type of calls placed on a telephone set, and which can also provide an automatic timer for giving an indication of the time duration of a non-restricted telephone call.

Another object of the present invention is to provide an apparatus for restricting the type of calls placed on a telephone set, and which can be placed directly across the telephone line without directly breaking the line.

Yet another object of the present invention is to provide an apparatus for restricting the type of calls placed on a telephone set and which can be coupled to the telephone line without loading or causing a degradation of the telephone line.

A further object of the present invention is to provide an apparatus for restricting the type of telephone calls placed onto a telephone line and which can accommodate voltage fluctuations on the line and dial pulse spikes generated onto the line resulting from dialing of the number.

Yet another object of the present invention is to provide an apparatus for restricting the type of calls placed on the telephone line which is simple in construction, low in cost, easy to install, and simple to operate.

Briefly, in accordance with the present invention there is provided an apparatus for restricting the type of calls placed by a telephone set onto a telephone line. The apparatus comprises a sensing means which detects the placing of the telephone in an off-hook condition. Control means are energized by the sensing means and provides a condition for a call to be placed onto the telephone line. Disabling means responds to the control means for establishing a disabling condition on the telephone line thereby inhibiting further progress of the telephone call when it is of a restricted type.

Although the apparatus can be placed in series with the telephone line thereby breaking the line, a feature of the apparatus is that it can be coupled across the telephone line in parallel thereby avoiding the necessity of breaking the line.

The apparatus also includes latching means for selectively inhibiting the operation of the disabling means, whereby selected personnel can generate a signal, such as a tone frequency, onto the line which operates the latching means thereby overriding the restrictions.

In a first embodiment of the invention, the sensing means comprises a timing circuit, such as a resistor and capacitor combination, which begins charging toward a series battery voltage upon placing of the telephone in an off-hook condition. After a predetermined amount of charging, the threshold voltage of a trigger circuit is reached, whereby an output pulse is produced which triggers a tone generator to place a specified frequency onto the telephone line. This frequency operates to disconnect a selected type of call placed on the line. For example, by placing a 2.6 KHz frequency on the line, all long distance calls outside a specified local area are disconnected.

In a second embodiment of the invention a DC level detector senses the change of the voltage level when the telephone set is placed in an off-hook condition and energizes a counting means which counts the number of digits of the number called on the telephone set. When a preselected count is reached, a count output signal is provided which operates the disabling means to establish the disabling condition. For Touch-Tone systems, the disabling condition can include a dual tone frequency signal, simulating a Touch-Tone number, which is maintained on the line for a specified period of time thereby preventing further numbers from being entered. In the case of a rotary dial system, the disabling condition can be the switching of a resistor means in parallel across the line and retaining it for a specified length of time during which time no further digits can be dialed onto the line.

In a third embodiment of the invention, upon placing the telephone in an off-hook condition, the dialing is continuously disabled. At intermittent times, enabling intervals are provided. During each such interval, a respective digit of a telephone number can be entered. The number of intervals provided corresponds to the number of digits permitted to be dialed onto the telephone line.

A feature of the invention is that the number of digits permitted to be entered can be selectively controlled, whereby the restriction can eliminate all area code telephone numbers thereby permitting only local calls to be made. It can also restrict local calls as well and permit only internal calls. It can also be selectively adjusted to permit local calls with and without the addition of an access code number. Furthermore, total restriction can be selectively applied to thereby eliminate all outgoing calls.

BRIEF DESCRIPTION OF THE DRAWINGS

With the above and additional objects and advantages in view, as will hereinafter appear, this invention comprises the devices, conbinations and arrangements of parts hereinafter described by way of example and illustrated in the accompanying drawings of a preferred embodiment in which.

In the various figures of the drawing, like reference characters designate like parts.

DETAILED DESCRIPTION OF THE PREFERRED EMBODIMENT

Figure 1:
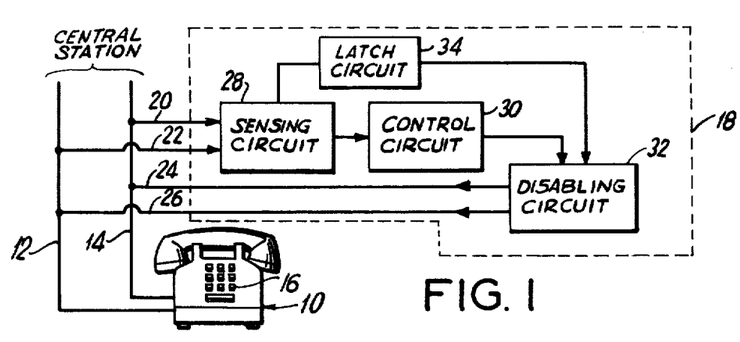
FIG. 1 is a block diagram showing the generalized circuit of the present invention.

Referring now to FIG. 1, there will be shown the basic concept of the present invention which provides for restricting a type of a call placed on a telephone set. The telephone set, shown generally at 10, is connected to the conventional telephone lines 12, 14. By way of example, there is shown a Touch-Tone telephone with the push buttons 16 capable of utilization for entering a telephone number onto the telephone line to call that number. The telephone lines proceed to a station such as a switchboard, a PBX or another type of central station.

The restricting apparatus is shown contained within the dotted lines and is designated at 18. This apparatus is shown connected in parallel across the telephone lines. The activities on the telephone line are detected by means of the wires 20, 22 connected across the telephone lines as inputs to the restricting apparatus 18. The output from the restricting apparatus 18 is placed in parallel onto the telephone lines by means of the wires 24, 26. By means of the parallel coupling, the telephone line does not have to be cut or broken, and accordingly, the apparatus can be connected without the need of a telephone serviceman. Such apparatus can be simply installed without breaking the line at all.

The restricting apparatus 18 includes a sensing circuit 28 which receives signals from lines 20, 22 indicating the state of the telephone line. When the telephone set is placed off-hook, the sensing circuit detects such off-hook condition and appropriately operates the control circuit 30. The control circuit permits the utilization of the telephone to place the call onto the telephone line. When a call of a restricted nature is detected, th disabling circuit 32 is operated which establishes a disabling condition on the telephone line by means of the wires 24, 26. Such disabling condition inhibits further progress of the telephone call.

For example, the restricting apparatus can be utilized to prevent the placing of long distance calls on the telephone line. Accordingly, local calls will be permitted. The disabling circuit will therefore operate to establish a disabling condition which inhibits further progress of long distance calls, while uneffecting any local calls being made. In a similar manner, the circuit can be utilized to inhibit local as well as long distance calls and only permit utilization of the telephone for internal extension calls within the same telephone system. All other calls will be disabled by the disabling circuit. The apparatus can also be utilized to prevent all types of outgoing calls on the telephone set and restrict its use to only incoming calls.

When the restricted apparatus is connected to a particular telephone line, all users of that particular telephone set connected to that telephone line will not be able to place restricted calls on any telephone associated with that line. However, frequently, it is desired that selected personnel be able to make unrestricted calls even when the restricting apparatus is present on that particular telephone line. For example, a company may wish to place the restricting apparatus on its telephones whereby its general personnel cannot make long distance calls. However, certain selected executives should be able to utilize any telephone in an unrestricted manner even for long distance calls. It is accordingly necessary to be able to override the existing restricting apparatus. In order to achieve this overriding, there is included a latch circuit 34. The latch circuit is responsive to a particular signal placed on the telephone line and in response thereto serves to inhibit the disabling circuit 32.

For example, each executive can be given a tone generator which produces a particular tone frequency. When the executive picks up a telephone having a restricting apparatus associated with it, the tone generator is operated to emit the particular tone frequency onto the telephone line. The latch circuit responds to that tone frequency and operates to inhibit the disabling circuit. In this manner, the executive can proceed to make unrestricted telephone calls. Subseqently, when he replaces the telephone on-hook, the restricting apparatus will again become operative to further restrict all calls until another executive operates the tone generator. In order to operate the latch circuit 34, there can be included a tone detector, such as a tuned circuit, in series with a latching circuit, such as a switch or trigger circuit. The latch circuit can inhibit the disabling circuit or, alternately, it can be used to disable the control circuit whereby no signal is sent to the disabling circuit.

Although the circuit shown in FIG. 1 is coupled in parallel to the telephone lines, it should be understood that it could very well be connected in series to the telephone line. Specifically, it could be placed in series in such a manner that when a restricted call is detected it breaks the telephone line completely and disconnects all calls. If the call is not of the restrictive type, then it permits placing of that call as usual. However, when placed in series, it may be necessary to have a telephone installer interconnect the restricting apparatus.

Figure 2:
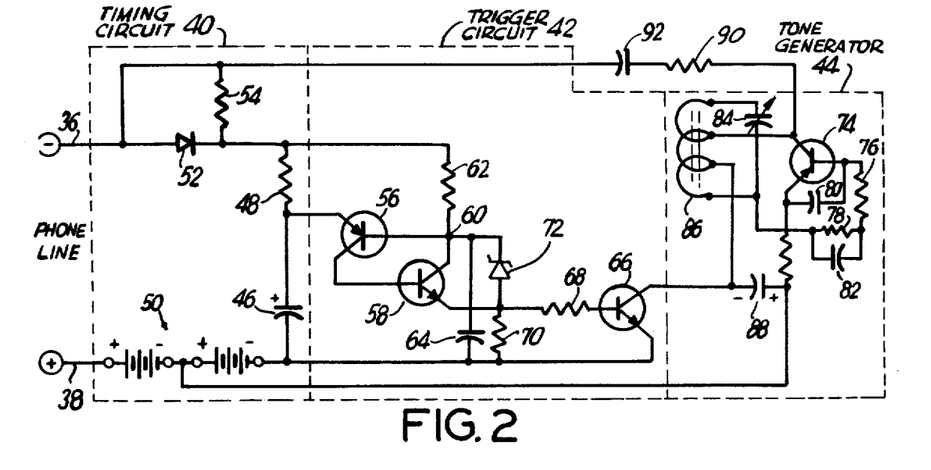
FIG. 2 shows a schematic circuit diagram showing a first embodiment of the present invention.

Referring now to FIG. 2 there is shown a first embodiment of the present invention. This embodiment is based upon a phenomenon presently utilized by the telephone companies. The telephone companies apparently divide up the long distance calls into a first zone close to the caller, and a second zone at a greater distance away. At the conclusion of long distance calls placed to the distant zone, a preselected frequency signal is placed on the line which automatically terminates the telephone conversation from both sides. At present there is utilized a signal of 2.6 KHz which is automatically sent onto the line by the central telephone station and serves to disconnect the telephone conversation at the conclusion of the call. This frequency, while automatically cutting off the telephone call for the distant zone, has no effect upon the close zone. This circuit will also disconnect operator assisted outgoing long distance calls beyond a specified zone. Upon the occurrence of this frequency on the telephone line, the operator assisted call will automatically be terminated.

By way of example, a 20 mile perimeter can be utilized as the close adjacent zone area. Long distance calls placed to location within this 20 mile surrounding area would be uneffected by the particular frequency. However, long distance calls placed to locations outside of the 20 mile area would be automatically disconnected when the preselected frequency is sent onto the line.

With respect to FIG. 2, the circuit provided is one that waits a sufficient length of time for entering a number on the telephone set. When that length of time has been reached, the preselected frequency signal is sent onto the telephone line. If the call entered was one that was outside the close by zone area, it will automatically be terminated upon the occurrence of the preselected frequency on the line. However, if the call is a local call, or one that was within the close by zone area, then it will be uneffected by the occurrence of the preselected frequency and such preselected frequency will be heard only as a slight beep on the line which will be ineffective to inhibiting such local calls.

Specifically, by way of example, there can be provided a timer, which can time either one minute, or four minutes, or any other selected amount of time. During that amount of time, there is sufficient opportunity to complete the entering of a telephone number. Then, the tone generator is triggered to emit the 2.6 KHz signal onto the telephone line. If the call was a long distance call to a location beyond the close by zone, that call will automatically be terminated by the presence of the 2.6 KHz signal. Other calls, however, will be uneffected. For the other calls, the signal will only appear as a short beep on the line which will not effect the call itself.

The amount of time selected can be predetermined as desired. For example, if the amount of time is selected as one minute, there will probably be only sufficient time for the party to place the call without giving him an opportunity to talk to the called party. On the other hand, by making the time at four minutes, it permits some talking on the long distance call, but effectively restricts the amount of talking to approximately three minutes, assuming approximately one minute for entering of the call.

The circuitry of FIG. 2 which carries out the aforementioned results is coupled to the lines 36, 38, which are connected in parallel across the telephone lines. These lines feed into a timing circuit, shown within the dotted lines 40, which provides the predetermined amount of time such as the one minute, four minutes, or similar amounts. Upon reaching the predetermined amount of time, the timer circuit 40 operates a trigger circuit, contained within the dotted lines 42, to produce a pulse output which is sent to the tone generator circuit 44, thereby producing the preselected frequency, as for example the 2.6 KHz signal which is sent onto the telephone line.

The timing circuit includes a capacitor 46 in series with a resistor 48 and a battery 50. A reverse poled diode 52 is also included in the series circuit. Connected in parallel across the diode 52 is a trickle resistor 54 for the battery current.

The trigger circuit 42 is shown to include a pair of oppositely poled transistors defining an avalanche circuit having a first transistor 56 whose emitter is connected between the resistor 48 and capacitor 46, and whose collector feeds the base of a second transistor 58. The base of the first transistor 56 and the collector of the second transistor are connected at point 60 which is attached on the one hand to a resistor 62 and on the other hand to a filter capacitor 64.

The output from the emitter of transistor 58 is connected to the base of amplifying transistor 66 through the voltage dividing circuit 68, 70. A Zener diode 72 is optionally connected across the transistor 58 and serves to maintain the voltage at a fixed level despite voltage drops which may occur on the voltage source of battery.

The output from the amplifier 66 feeds the tone generator 44. The tone generator includes transistor 74 having its conventional resistances 76 and 78 and capacitances 80 and 82 interconnected, and including the tuned circuit comprised of the variable capacitor 84 and the inductance 86. The capacitor 88 is inclined to provide a low impedance to AC signals in order to achieve proper oscillation. The output from the tone generator is sent across the resistor 90 and the capacitor 92 to place it onto the telephone line.

The operation of the circuit of FIG. 2 is as follows: When the telephone is on-hook, there exists approximately 50 volts across the telephone line. However, such voltage is prevented from reverse charging the capacitor 46 by means of the diode 52. When the telephone is placed off-hook, the voltage on the line drops to approximately 8 volts and the capacitor now begins charging to the voltage of the battery 50, which is typically 18 volts. The battery voltages charges across the resistor 48 until it reaches the threshold voltage which triggers the transistors 56, 58. As soon as such threshold voltage is reached, these transistors immediately turn on producing a sudden pulse output which passes through the amplifier 66 providing a trigger signal to trigger the tone generator into producing its frequency output. Typically, the tone generator is tuned to the 2.6 KHz frequency which is then placed onto the telephone line. If the called number is to a location in the zone beyond the close by zone, this emitted frequency will terminate the telephone call. On the other hand, if it is a local call or a long distance call within the close by zone, the tone generator will produce a signal having only the effect of sounding a beep onto the line but will not terminate the call.

By varying the value of the capacitor 46, the time delay until the trigger pulse occurs can be varied. After the transistors 56, 58 trigger, they continue to remain conductive, whereby the voltage across the capacitor will be maintained at a constant level and the capacitor will not continue to charge and discharge. As a result, only one output signal is produced from the trigger circuit 42 and only one pulse of tone frequency is sent onto the line even though the telephone remains off-hook. However, once the telephone is again placed on-hook, the capacitor discharges down to approximately zero volts and is now ready for further sensing of another off-hook condition.

The resistor 70 serves as part of the discharge path when the trigger pulse is generated and is utilized to control the length of time during which the tone will remain on the line. The use of the capacitor 64 avoids false triggering of the tone generator when spikes appear on the line. For certain types of dialing systems, each number dialed produces a spike. Such spikes might have a tendency to suddenly trigger the circuitry and produce tone output erroneously. This is prevented by means of the capacitor 64. The use of the Zener diode 72 maintains a constant voltage across the transistors preventing a change in frequency when the voltage across the battery or voltage source may drop.

It should be noted that the circuitry shown in FIG. 2 can be utilized either for a Touch-Tone or a rotary dial system. During the delay provided, there is no difference what type of telephone is utilized to enter the number. Furthermore, the tone signal will operate on both rotary dial and Touch-Tone systems to disconnect long distance calls beyond the specified zone.

In place of the two transistors 56, 58, as shown, it is possible to utilize a standard unijunction transistor to provide the trigger pulse. However, when using unijunctions they completely turn off after producing their output pulse. Once such unijunctions turn off, the capacitor 46 would then have a chance to recharge and after again reaching the threshold voltages would again trigger the unijunction and again produce another tone frequency on the line. This situation could actually provide an additional benefit. If the telephone call is one of the restricted types, the first occurrence of the tone signal on the line will serve to disconnect the call. However, if it is a non-restricted type call, the tone signal will be heard as a beep signal. By using the unijunction and selecting that the time of capacitor charging occurs at specified intervals, the beeps will appear at the end of each such interval. For example, by setting the timing at three minute intervals, after the first three minutes the tone generator signal will appear on the line. This will disconnect the restricted calls. For permissible calls, it will be heard as a beep signal giving an indication of a three minute signal. Thereafter, at every three minute interval, the beep signal will be heard. This method is useful in providing to the caller a warning of how long he speaks.

In place of the tone generator, it would be possible to utilize a tape playing device. For example, at present there are available two-way tape recorders where both sides of the conversation are recorded. Such recorders could be modified by including a short endless tape on the recorder with the tone desired placed on the tape. The tape is started when the telephone is placed off-hook and the timing begins. Upon reaching the preselected time, the tone signal is played. Such tone signal would again serve to disconnect all calls placed beyond the limited close by zone.

An additional benefit is available by utilizing the tape player. It is possible to record onto the tape a message warning the user that he is on a restricted line and no long distance or collect calls are accepted. This message would come before the tone signal. This message will warn the user that the apparatus will automatically terminate long distance calls. At the same time, should the user have the operator place the call for him, or should the operator call in a collect call, the operator would hear the message played and would be advised that the line is restricted and no collect calls are permitted.

Figure 3:
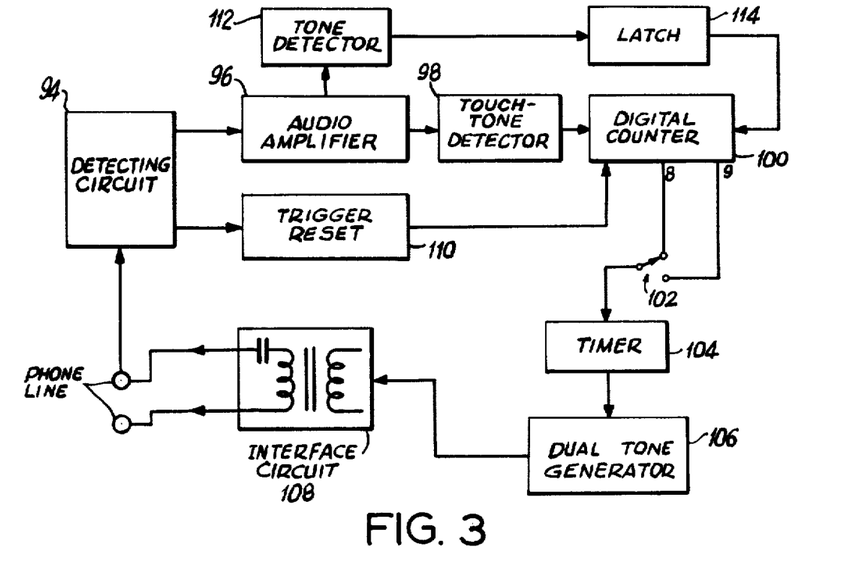
FIG. 3 is a block diagram showing a second embodiment of the present invention for use in a Touch-Tone system.

Referring now to FIG. 3 there is shown an alternate embodiment of the present invention. This embodiment is based upon the principle that long distance calls require the use of an area code prior to entering of the number, whereby the number of digits entered becomes greater. Specifically, at the present time ten digits are required to complete a long distance call, with the first three digits representing the dial code and the remaining seven digits representing the specific telephone number. In some situations, eight digits are utilized thereby in addition to the seven digit local number, an access number is called.

In order to restrict the placing of all long distance calls on the telephone line, it is necessary to terminate the call before the ten digits are entered. Specifically, after the occurrence of eight or nine digits, the call can be disabled thereby preventing the calling of long distance calls. This type of a restricting apparatus is shown, by way of example, in FIG. 3. With such type of systems, a slight variation must be provided to accommodate either the Touch-Tone numbers or the rotary dial numbers. The circuit shown in FIG. 3 is one which could be utilized with a Touch-Tone system.

Connected in parallel to the telephone line is a detecting circuit 94 which detects the change in voltage level of the telephone line when an off-hook condition of an associated telephone instrument is affected. The signals sent on the telephone line are then passed through the amplifier 96 to a Touch-Tone detector 98 such as MOSTEK integrated circuit chip Nos. 8030 or MK 5102, or chip Nos. M917 or M907 manufactured by Teltone, which detects any Touch-Tone number that is entered. Each time a number is entered it is detected by the tone detector, and it is passed onto and counted by means of the digital counter 100. At the output of the digital counter 100 is included a switch 102 whereby the output from the digital counter can be selected at either eight or nine numbers entered. For example, if the output is selected at eight, then only seven numbers will be permitted. As soon as the eight number is entered on the Touch-Tone phone, the digital counter will automatically produce an output. On the other hand, in order to permit the dialing of an access number in addition to the usual seven digit local number, it is possible to switch the output to the ninth number. In this manner, eight numbers are permitted to be dialed and at the entering of the ninth number the digital counter will provide an output.

The output from the digital counter is sent through a timer 104 which serves to energize a dual tone generator 106 and maintain the generator energized for the selected length of time. The output from the dual tone generator is sent to an interface circuit, typically including a transformer, capacitor, etc, which places the generated dual tone signal onto the telephone line. By way of example, the dual tone generator can be utilized to generate the two frequencies which simulate one of the numbers of the Touch-Tone system. For simplicity, it can be utilized to generate the two frequencies which constitute the number "1" on the Touch-Tone system. The timer can be set at approximately thirty seconds. When the digital counter senses that a restricted call has been placed, specifically one that has more numbers than permissible, it will energize the dual tone generator to place the number "1" onto the telephone line for thirty seconds. Within such thirty seconds, there will automatically occur a disconnect pulse on the telephone line from the central switching station or the operator will get onto the line. The length of time can be adjusted as desired.

Since this number is placed onto the telephone line, it prevents any further dialing during the course of this thirty second interval. After the end of that interval, or such other similar interval which causes the telephone line to disconnect, the line is automatically disconnected and the call is not completed. If the time were shorter than the length of time needed for the line to disconnect, the user might be able to wait until the timer finished placing the dual tones on the line and then begin redialing again. Therefore, the length of time is preferably as long as the time needed for the automatic disconnect pulse or for the operator to get on the line. It is understood that any number other than "1" can also be utilized as the disabling number. It should be further appreciated that this system is placed in parallel with the telephone line and the telephone line does not have to be broken in order to connect this system nor does the telephone line have to be bridged by a loading resistor in order to abort the normal call out procedure.

As soon as the telephone instrument is restored to the on-hook condition, the on-hook line voltage is detected, and the trigger circuit 110 sends a reset pulse to the digital counter whereby each time the telephone is restored in an on-hook condition, the digital counter is reset to again be able to start counting the number of digits entered.

The embodiment shown in FIG. 3 includes the override feature for use by selected executives. Specifically, the output from the audio amplifier 96 is also sent to a tone detector 112 which is set to detect a particular tone entered onto the telephone line. The executive would have a particular tone generator which could enter the selected tone on the telephone line. When detected by the tone detector 112, it sends a signal to the latch 114 which operates to disable the digital counter 100. Therefore, when subsequent numbers are entered, the digital counter would not produce an output and all types of calls could be placed on the telephone line.

The various components of the circuit can be provided by standard off-the-shelf components. For example, many of the components are built utilizing a quad NAND gate, and specifically IC chip No. 74C00 distributed by National Semiconductor Company. By interconnecting the various terminals on this chip, numerous circuits could be provided. For example, interconnecting two of these NAND gates can provide the latch circuit 114. By interconnecting two NAND gates and adding a timing network of a resistor and capacitor, the timing latch 104 can be provided. Furthermore, even the audio amplifier 96 can be provided with the same chip. The other circuits are of a type well known in the art and can easily be obtained.

Figure 4:
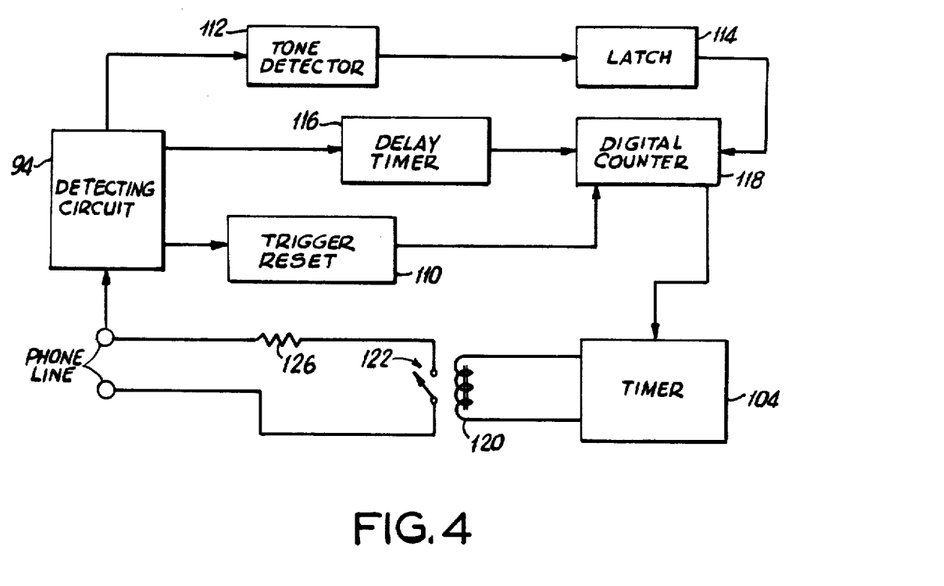
FIG. 4 is a block diagram of the second embodiment of the present invention for use in a rotary dial telephone system.

In order to modify the circuit of FIG. 3 for a rotary dial system, reference is had to the circuit shown in FIG. 4. Again there is provided a detecting circuit 94 which connects onto the telephone line. The output from the detecting circuit is sent to a delay timer 116 which provides an initial delay period. Subsequently, the numbers entered onto the telephone line by means of the rotary dial pass through the delay timer and then are counted by means of the digital counter 118. The output from the digital counter passes through a timer 104 whose output energizes a relay 120 to close the relay switch 122 placing the resistor 126 in parallel across the telephone line.

By way of example, the operation of the circuit shown in FIG. 4 is as follows: When the telephone is placed in an off-hook condition, the telephone numbers are entered by means of the rotary dialer, the numbers are sent through the delay timer, by way of example, a 200 millisecond delay, and then are counted by the digital counter. The output from the digital counter can again be selected at eight or nine digits, as desired, and once such restricted number of digits dialed is reached it operates the timer to close the switch 122 for a preselected amount of time, as for example thirty seconds. During this time it places the resistor 126 on the telephone line. The resistor can be approximately 1 k ohms. The presence of this resistor on the line prevents dialing of further numbers onto the telephone line. For example, the presence of such resistor is somewhat like an extension being lifted on the telephone line. With an open extension, no additional telephone numbers can be dialed onto the line. At the same time, it does not prevent any incoming calls from coming in. Only outgoing calls cannot be dialed during this time. As a result, once the number of digits is greater than that allowed, the resistor is placed in the line and further dialing is inhibited. Such inhibit condition remains for a sufficient length of time, as for example thirty seconds, during which the operator will come on the line or a disconnect pulse will be placed on the line.

In the embodiment shown in FIG. 4, there is again provided the tone detector 112 and the latch circuit 114 to permit executive override of the inhibiting signal, permitting him to make all types of telephone calls despite the presence of the restricting apparatus.

Both the circuits of FIGS. 3 and 4 are shown to be connected in parallel across the telephone line. However, it should be understood that appropriate circuitry could be included whereby the entire line is disabled. For example, a series switch could be placed in the line whereby when a restricted call is placed, the line is completely broken. However, this may require a telephone serviceman to install the apparatus. In both of the embodiments of FIGS. 3 and 4, as soon as the telephone instrument is restored to the on-hook condition, the on-hook line voltage is detected, and the trigger circuit 110 sends a reset pulse to the digital counter whereby each time the telephone is restored in an on-hook condition, the digital counter is reset to again be able to start counting the number of digits entered.

Both the embodiments of FIGS. 3 and 4 can be powered by a common 12 volt DC supply which could be incorporated within the telephone apparatus circuitry of the present invention. Although the circuits have been described in connection with restricting calls to eight or nine digits, it should be understood that other restrictions could be used. For example, a total of four digits could be permitted, whereby only internal calls could be placed. Furthermore, total restriction could be used so that no external calls could be made on the telephone. For example, each time even one digit is dialed, the telephone is disconnected. In this way the telephone will only be utilized as an incoming call telephone with no outgoing calls permitted.

With the circuitry shown in FIGS. 3 and 4, although outgoing calls can be restricted, it might be possible for a user to call the operator and ask the operator to place a long distance call. In order to extend the restriction to these types of situations, the use of the tone generator, as shown in FIG. 2, could be additionally added. In this manner, the use of the 2.6 KHz tone can be sent on the line after a predetermined amount of time. This would also disconnect any operator assisted calls of a long distance nature.

By means of the combination of FIG. 2 as well as the approach taken in FIGS. 3 and 4, all types of long distance calls can be restricted. The benefits of the circuitry shown in FIGS. 3 and 4 restricts all area code numbers whether in a close by adjacent zone or a distant zone. The benefit of utilizing the 2.6 KHz signal is such as to prevent operator assisted calls. The combination of the two embodiments can totally restrict all long distance calls both in close by and in far distance zones, as well as preventing operator assisted calls of a long distance nature.

Figure 5:
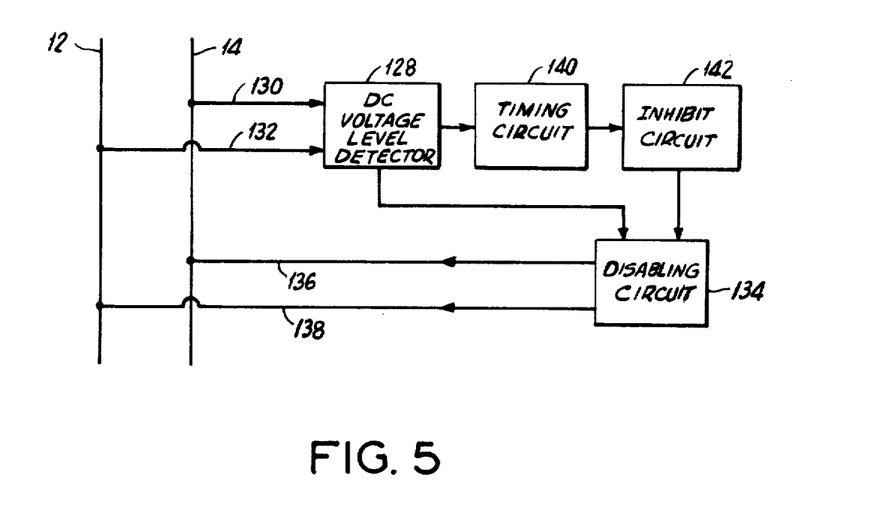
FIG. 5 is a block diagram of a third embodiment of the present invention.

Referring now to FIG. 5, there is shown a third embodiment of the present invention. In FIG. 5 a DC voltage level detector 128 is connected in parallel across the telephone lines 12, 14 by means of the parallel leads 130, 132. The placing of the telephone set in an off-hook condition, thus rendering the telephone line into an off-hook voltage condition, is detected. At that point, a disabling circuit 134 and the interval enabling timing circuit 140 are energized. The disabling circuit 134 disables the telephone lines preventing the entering of any telephone number on the line. The disabling circuit output is sent onto the line by means of lines 136, 138. At specific intervals, as controlled by the interval enabling timing circuit 140, an inhibit circuit 142 is energized which inhibits the disabling circuit. During those intervals of time during which the disabling circuit is inhibited, a number can be entered on the line. In this manner, the number of intervals can be selected so as to permit only local dialing while preventing long distance dialing. For example, a total of eight intervals can be provided whereby only the seven digits of a local number together with an access number can be entered. No further enabling intervals are provided and, as a result, no further numbers can be entered. In this manner, no long distance calls can be made.

By way of example, the interval enabling timing circuit 140 may include audio oscillator means designed to emit a specific audio frequency within eight evenly spaced time intervals. The inhibit circuit 142 includes a resonant circuit which is operatively responsive to the audio frequency emission of the enabling timing circuit 140, and consequently inhibits the disabling circuit 134.

Another example of a suitable interval enabling timing circuit 140 is a magnetic tape player which contains a tape on which is prerecorded eight specific frequency signals of suitable time length and suitable time spacing so as to affect the desired time interval spacing for properly inhibiting the disabling circuit 134.

An additional benefit is available by utilizing the tape player. It is possible to record onto the tape a message warning the user that he is on a restricted line and no long distance or collect calls are accepted. This message would come before the tone signals. This message will warn the user that the apparatus will automatically terminate long distance calls. At the same time, should the user have the operator place the call for him, or should the operator call in a collect call, the operator would hear the message played and be advised that the line is restricted and no collect calls are permitted.

By varying the length of time during which the disabling circuit 134 is inhibited, there can be accommodated both a Touch-Tone system, which requires a short interval for entering a number, as well as a rotary dial system, which requires a longer interval for entering a number.

It should be appreciated that in the embodiment of FIG. 5 there could also be included the embodiment of FIG. 2 which contains the 2.6 KHz signal placed on the line after a predetermined amount of time. This would serve to abort operator assisted calls of a long distance nature beyond a specified zone. There could also be included the executive override circuit as was described in connection with the first two embodiments. With the embodiment of FIG. 5, the number of digits to be dialed can be easily selected by selecting the number of intervals. At the same time, total restriction could also be obtained by preventing any intervals at all and providing for total disabling of the circuit, whereby only incoming calls are permitted on the telephone and no external calls at all are permitted.

It should be noted that other suitable solid-state devices can be used instead of the transistors shown in FIG. 2.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An apparatus for restricting the type of calls placed on a telephone line said telephone line being associated with at least one telephone set, comprising:
    timing means coupled across the telephone line and responsive to an off-hook condition to begin a timing cycle during which all calls can be placed onto the telephone line;
    trigger circuit means responsive to a pre-determined time reached in said timing cycle and producing an output thereafter; and
    call disabling means for establishing a disabling condition on the telephone line, and including tone generator means responsive to said trigger circuit means output for producing a specified frequency onto the telephone line, which frequency operates to automatically defeat a selected type of call placed onto the telephone line.

2. An apparatus as in claim 1, and further comprising coupling means for connecting said timing means in parallel across the telephone line.

3. An apparatus as in claim 2, and further comprising latching means for selectively inhibiting the operation of said call disabling means.

4. An apparatus as in claim 3, and further comprising detection means coupled to said telephone line for detecting a selected signal entered onto the telephone line, and in response thereto operating said latching means.

5. An apparatus as in claim 4, wherein said detection means comprises a tone detector for detecting a preselected frequency placed onto the telephone line.

6. An apparatus as in claim 1, wherein said timing means comprises capacitor means coupled across the telephone line for charging through a resistor means in only one polarized direction, said charging commencing when a telephone set is placed in an off-hook condition, the values of said capacitor means and resistor means being selected to provide said predetermined time.

7. An apparatus as in claim 6, and further comprising diode means connected in series with said capacitor means for preventing charging of said capacitor means in a reverse direction during an on-hook condition.

8. An apparatus as in claim 6, and further comprising voltage source means connected in series with said capacitor means and said line for charging the capacitor means during an off-hook condition.

9. An apparatus as in claim 8, wherein said trigger circuit means comprises solid-state circuit means which provide a pulse output when said capacitor means is charged a sufficient amount and thereafter remaining in a conductive condition, whereby further recharging of said capacitor means is prevented to thereby prevent further pulse outputs from said trigger circuit means, and wherein said tone generator means responds only to said pulse output.

10. An apparatus as in claim 9, wherein said solid-state circuit means is an avalanche circuit having a pair of oppositely poled transistors.

11. An apparatus as in claim 9, and further comprising a Zener diode coupled across said solid-state circuit means for maintaining a fixed level of voltage across said solid-state circuit means in the presence of voltage drops occurring on said voltage source means.

12. An apparatus as in claim 9, and further comprising filter means coupled to said solid-state circuit means for avoiding false triggering by voltage spikes occurring on the telephone line.

13. An apparatus as in claim 9, and further comprising a timing circuit coupled between said solid-state circuit means and said tone generator means for controlling the length of time of occurrence of said specified frequency on the telephone line.

14. An apparatus as in claim 6, wherein said trigger circuit means comprises solid-state circuit means which provides a pulse output each time said capacitor means is charged to a threshold voltage, said capacitor means cyclically charging and discharging, whereby a repetitive timed pulse output is provided, and wherein said tone generator means responds to each of said pulse outputs to place a tone signal onto the telephone line for providing an indication of preestablished time intervals.

15. An apparatus as in claim 14, wherein said solid-state circuit means includes a unijunction transistor.

16. An apparatus as in claim 1, wherein said specified frequency is substantially 2.6 KHz.

17. An apparatus as in claim 1, and further comprising coupling means for connecting said timing means in parallel across the telephone line.

18. An apparatus as in claim 1, wherein said call disabling means inhibits further progress of restricted type of calls, even when placed by an operator.

19. An apparatus as in claim 1, wherein the telephone set is of the Touch-Tone type.

20. An apparatus as in claim 1, wherein the telephone set is of the rotary dial type.

21. An apparatus as in claim 1, wherein the telephone line is associated with both Touch-Tone and rotary dial type telephone sets.

22. An apparatus for restricting the type of call placed onto a telephone line, said telephone line being associated with at least one telephone set of a Touch-Tone type, comprising:
    sensing means coupled across the telephone line for detecting the change of voltage on the telephone line resulting from an off-hook condition, counting means for counting the number of digits entered onto the telephone line and producing a count output upon reaching a predetermined count, and disabling means responsive to said count output for establishing a disabling condition on the telephone line, thereby blocking further progress of the telephone call when it is of a restricted type, and wherein said disabling means comprises means for producing a dual-tone combination of frequencies simulating a preselected Touch-Tone digit, latch means for maintaining said simulation for a preset length of time and interface means for coupling said simulated digit onto the telephone line for said preset length of time.

23. An apparatus as in claim 23, and further comprising reset means responsive to an on-hook condition for resetting said counting means.

24. An apparatus as in claim 22, wherein said counting means comprises an audio amplifier coupled to said DC level detector for amplifying the Touch-Tone signals, a tone detector for detecting the entering of a digit, and a digital counter for counting the number of digits in the telephone number entered.

25. An apparatus as in claim 22, and further comprising switch means coupled between said counting means and said disabling means for selecting the number of digits which shall produce said count output.

26. An apparatus as in claim 22, and further comprising a tone detector coupled to said DC level detector for detecting a preselected frequency signal present on the telephone line, and a latching means coupled between said tone detector and said counting means for inhibiting said counting means upon the occurrence of said preselected frequency on the telephone line.

27. An apparatus as in claim 22, wherein said interface means comprises an isolating transformer.

28. An apparatus as in claim 22, wherein said interface means comprises an isolating capacitor.

29. An apparatus for restricting the type of calls placed onto a telephone line, said telephone line being associated with at least one telephone set, comprising:
    sensing means for detecting an off-hook telephone line voltage condition,
    call disabling means responsive to said sensing means for producing a continuous disabling output onto the telephone line for blocking entering of any digits on the telephone line, and
    inhibiting means for providing at spaced intervals enabling signals which inhibit said call disabling means during each of said intervals permitting a respective digit to be entered onto the telephone line, the number of enabling signals being equal to the number of digits of a telephone number which can be entered without restriction.

30. An apparatus as in claim 29, wherein said inhibiting means provides an audible signal on the telephone line at the occurrence of each said intervals.

31. An apparatus as in claim 29, wherein said telephone set is of the Touch-Tone type.

32. An apparatus as in claim 29, wherein said telephone set is of the rotary dial type.

33. An apparatus as in claim 29, wherein said telephone line is associated with both Touch-Tone and rotary dial type telephone sets.

34. An apparatus as in claim 29 and further comprising second call disabling means, said second disabling means comprising timing means coupled across said telephone line, said timing means responsive to an off-hook line voltage condition beginning a timing cycle, and a tone generator means responsive to a predetermined time reached in said timing cycle producing a specified frequency onto the telephone line, which frequency operates to disconnect a type of long distance call of a specific category placed onto the telephone line, and wherein the number of said enabling signals must be in excess of one in order to allow a call number in excess of one digit to be entered onto the said telephone line, and wherein said second call-disabling means will nonetheless operate to affect said disconnection of said type of call irrespective of the number of said enabling signals provided by said inhibiting means.

35. An apparatus as in claim 34, wherein said specified frequency is substantially a 2.6 KHz tone and wherein said type of call includes operator assisted calls of a long distance nature of said category.

36. An apparatus for restricting the type of calls placed onto a telephone line, said telephone line being associated with at least one telephone set, of the Touch-Tone type, said apparatus comprising:
    sensing means for detecting an off-hook telephone condition,
    call disabling means responsive to the sensing means for establishing a disabling condition on the telephone line for inhibiting further progress of a telephone call placed onto the telephone line when it is of a restricted type, said call disabling means comprising a means for imposing onto the telephone line a dual tone combination of frequencies simulating a preselected Touch-Tone digit for thereby blocking the effective transmission of the telephone number onto the telephone line.

37. An apparatus as in claim 36, wherein said imposing means comprises a dual tone generator.

38. An apparatus for restricting the type of call placed onto a telephone line, said telephone line being associated with at least one telephone set, comprising:
    sensing means coupled across the telephone line for detecting the change of voltage on the telephone line resulting from an off-hook condition, counting means for counting the number of digits called onto the telephone line and producing a count output upon reaching a predetermined count, and disabling means responsive to said count output for establishing a disabling condition on the telephone line, thereby blocking further progress of the telephone call when it is of a restricted type, said disabling means comprising means for providing a specified frequency onto the telephone line which operates to defeat a selected type of call placed on the telephone line.

39. An apparatus for restricting the type of call placed onto a telephone line, said telephone line being associated with at least one telephone set of the Touch-Tone type, comprising: sensing means coupled across the telephone line for detecting the change of voltage on the telephone line resulting from an off-hook condition, counting means for counting the number of digits called onto the telephone line and producing a count output upon reaching a predetermined count, and disabling means responsive to said count output for establishing a disabling condition on the telephone line, thereby blocking further progress of the telephone call when it is of a restricted type, and wherein said counting means comprises an audioamplifier coupled to said sensing means for amplifying the Touch-Tone signals, a tone detector for detecting the entering of a digit, and a digital counter for counting the number of digits in the telephone number entered.

40. An apparatus for restricting the type of call placed onto a telephone line, said telephone line being associated with at least one telephone set, comprising:

sensing means coupled across the telephone line for detecting the change of voltage on the telephone line resulting from an off-hook condition;

counting means for counting the number of digits entered onto the telephone line and producing a count output upon reaching a predetermined count;

first disabling means responsive to said count output for establishing a disabling condition on the telephone line when the number of digits entered coincide with said predetermined count thereby blocking further progress of the telephone call;

second disabling means comprising timing means coupled across said telephone line, said timing means responsive to an off-hook line voltage condition beginning a timing cycle; and tone generator means responsive to a predetermined time reached in said timing cycle producing a specified frequency onto the telephone line, which frequency operates to defeat a type of call of a specific category placed onto the telephone line, irrespective of the presence of said predetermined count.

41. An apparatus as in claim 40, wherein said first disabling means comprises a resistor means and a switch means in series circuit combination, said switch means responsive to the output of said counting means for assuming a responsive switched position to place the resistor in parallel across the telephone line, and a latch means for maintaining said switch means in such responsive switched position for a preset length of time.

42. An apparatus as in claim 40, wherein said predetermined count is in excess of one in order to produce said count output and wherein said second disabling means operates to defeat said call of a specific category irrespective of the presence of said count output.

* * * * *